United States Patent [19]

King et al.

[11] Patent Number: 4,773,627
[45] Date of Patent: Sep. 27, 1988

[54] GATE VALVE

[75] Inventors: Nolan D. King; Jeffrey M. Bowman, both of Portland, Oreg.

[73] Assignee: Rovang, Inc., Portland, Oreg.

[21] Appl. No.: 71,940

[22] Filed: Jul. 6, 1987

[51] Int. Cl.[4] .............................................. F16K 3/00
[52] U.S. Cl. .................................... 251/328; 251/361
[58] Field of Search ............... 251/326, 327, 328, 316, 251/317, 305, 361, 363; 137/375

[56] References Cited

U.S. PATENT DOCUMENTS

| | | | |
|---|---|---|---|
| 3,784,158 | 1/1974 | Cave | 251/327 |
| 4,112,969 | 9/1978 | Still | 251/328 X |
| 4,201,365 | 5/1980 | Paptzun et al. | 251/328 |
| 4,280,655 | 7/1981 | Duprez et al. | 251/361 X |
| 4,377,274 | 3/1983 | Maybew, Jr. | 251/328 X |
| 4,575,046 | 3/1986 | Krause et al. | 251/303 X |
| 4,603,864 | 8/1986 | Roftis | 251/328 X |

Primary Examiner—A. Michael Chambers
Assistant Examiner—John C. Fox
Attorney, Agent, or Firm—Stoel Rives Boley Jones & Grey

[57] ABSTRACT

An improved gate valve for effective sealing regardless of the pressure of the fluid of the conduit to which the valve is attached. The gate valve comprises a body (20) having opposing upstream and downstream sides (46, 44). Each side has a conduit-joining surface (72, 73) formed thereon. The body is configured for connection between two axially aligned conduits (24, 25) with each conduit-joining surface abutted against the end of an associated conduit. A resilient liner (27) is attached to the body between the valve gate (32) and the body (20). The liner also covers the portion of the body that defines the port. The liner includes a sealing surface (60) formed thereon. The sealing surface is configured for sealing contact with the portion of the edge surface of the gate that resides within the body when the gate is in the closed position. The gate valve also includes at least one seal ring (62) positioned against the body at the periphery of the port on one side of the gate. The seal member has a gate-engaging part (64) located adjacent the gate. The gate-engaging part has a face formed thereon for sealing contact with the downstream surface of the gate when the gate is in the closed position.

7 Claims, 2 Drawing Sheets

GATE VALVE

BACKGROUND OF THE INVENTION

This invention relates to gate valves and, in particular, to gate valves lined with wear-resistant or corrosion-resistant material.

Gate valves are often used to control the flow of abrasive slurries transported through tubular conduits. Gate valves used for this purpose are often lined with resilient material such as polyurethane. The resilient lining protects the valve from rapid wear caused by the abrasive solids in the slurry.

Gate valves generally include a body having a lower portion that is secured between the ends of two axially aligned conduits. The upper portion of the body extends upwardly from the conduits. The lower portion has a port formed through it. The shape of the port is usually circular, substantially conforming to the shape of the opening in the conduits. The port provides a fluid passage between the two conduits. The body also has a slot formed in it. The slot is configured to receive a thin flat gate that slides within the slot. The slot is configured so that the gate can slide across the port in the lower portion of the body. To close the gate valve, the gate is extended far enough into the lower portion of the valve body to occlude the fluid passage between the two conduits. The upper portion of the valve body carries suitable mechanisms (threaded stem, handwheel, etc.) for controlling the movement of the gate.

It is important that the valve gate seat properly when closed. That is, to prevent leakage, an effective seal must be formed between the closed gate and the part of the body that defines the port. One common method of ensuring that the gate is properly seated utilizes the upstream pressure in the fluid carried by the conduits to force the gate against a seal ring that is located around the valve port on the downstream side of the gate. The pressure of the fluid exerted against the closed gate promotes an effective seal between the gate and the seal ring. Typically, two or more sealing wedges are mounted to the lower portion of the body at spaced-apart locations around the port just upstream of the gate. These sealing wedges guide the gate against the seal ring as the gate is moved into the closed position. In some lined gate valves, such as described in U.S. Pat. No. 4,201,365 issued to Paptzun et al., the seal ring is a replaceable unit formed of resilient material.

Valves that utilize the fluid pressure in the upstream conduit to promote the sealing of the gate often leak when the pressure in the conduit drops. The leakage is a result of the drop in fluid pressure, which reduces the sealing force of the gate against the seal ring. Gate valves can be designed to prevent leakage at low pressure by configuring the valve to provide a tight fit between the gate and seal ring at low pressure; however, a gate valve so configured can not be used with conduit systems in which fluid pressure can vary over a wide range of amounts because as the amount of fluid pressure in the conduit increases, the gate will seat so tightly against the seal ring that it becomes very difficult to operate the valve.

SUMMARY OF THE INVENTION

This invention is directed to an improved gate valve that provides effective sealing of the closed gate regardless of the pressure of the fluid in the conduit to which the valve is connected.

The gate valve formed in accordance with this invention particularly comprises a body having opposing upstream and downstream sides, each side having a conduit-joining surface formed thereon. The body is configured for connection between two axially aligned conduits. The body also has a slot extending partly through it between the opposing sides. A port extends through the body across the slot and defines a passage for fluid flow between the two conduits. The gate valve also includes a gate configured for sliding movement within the slot. The gate has an upstream surface and opposing downstream surface, and an edge surface that extends between the peripheries of the upstream and downstream surfaces. The gate is movable into and out of a closed position. The fluid passage is occluded when the gate is in the closed position.

A resilient liner is attached to the body between the gate and the body. The liner also covers the portion of the body that defines the port. The liner includes a sealing surface formed thereon. The sealing surface is configured for sealing contact with the portion of the edge surface of the gate that resides within the body when the gate is in the closed position. The contact between the sealing surface and the edge surface of the gate provides a leakproof seal at relatively low fluid pressures.

The gate valve also includes at least one seal member positioned against the body at the periphery of the port on one side of the gate. The seal member has a gate-engaging part located adjacent the gate. The gate-engaging part has a face formed thereon for sealing contact with the downstream surface of the gate when the gate is in the closed position. The seal member also has a flange connected to the gate-engaging part which extends therefrom to be secured between the conduit-joining surface formed on the downstream side of the body and the associated conduit. The contact between the seal member and the downstream surface of the gate provides a leakproof seal at relatively high fluid pressures.

As another aspect of this invention, the flange of the seal member is substantially incompressible. As a result, the gate-engaging part of the seal member is precisely secured in position with the face of the gate-engaging part held against the gate under substantially uniform pressure.

As another aspect of this invention, the lined body is configured to receive a seal member on both sides of the gate, thereby providing sealing capability for flow in either of the two opposing directions.

As another aspect of this invention, the liner is configured to have a ridge formed therein to protrude inwardly from the remaining portion of the liner and contact the portion of the edge surface of the gate that resides within the port when the gate is in the closed position. The ridge provides a guide surface for retaining the gate-engaging part of the seal member in precise position adjacent the gate.

BRIEF DESCRIPTION OF THE DRAWINGS

FIG. 5 is an isometric view of a seal ring.

DETAILED DESCRIPTION OF A PREFERRED EMBODIMENT

Figure 1:
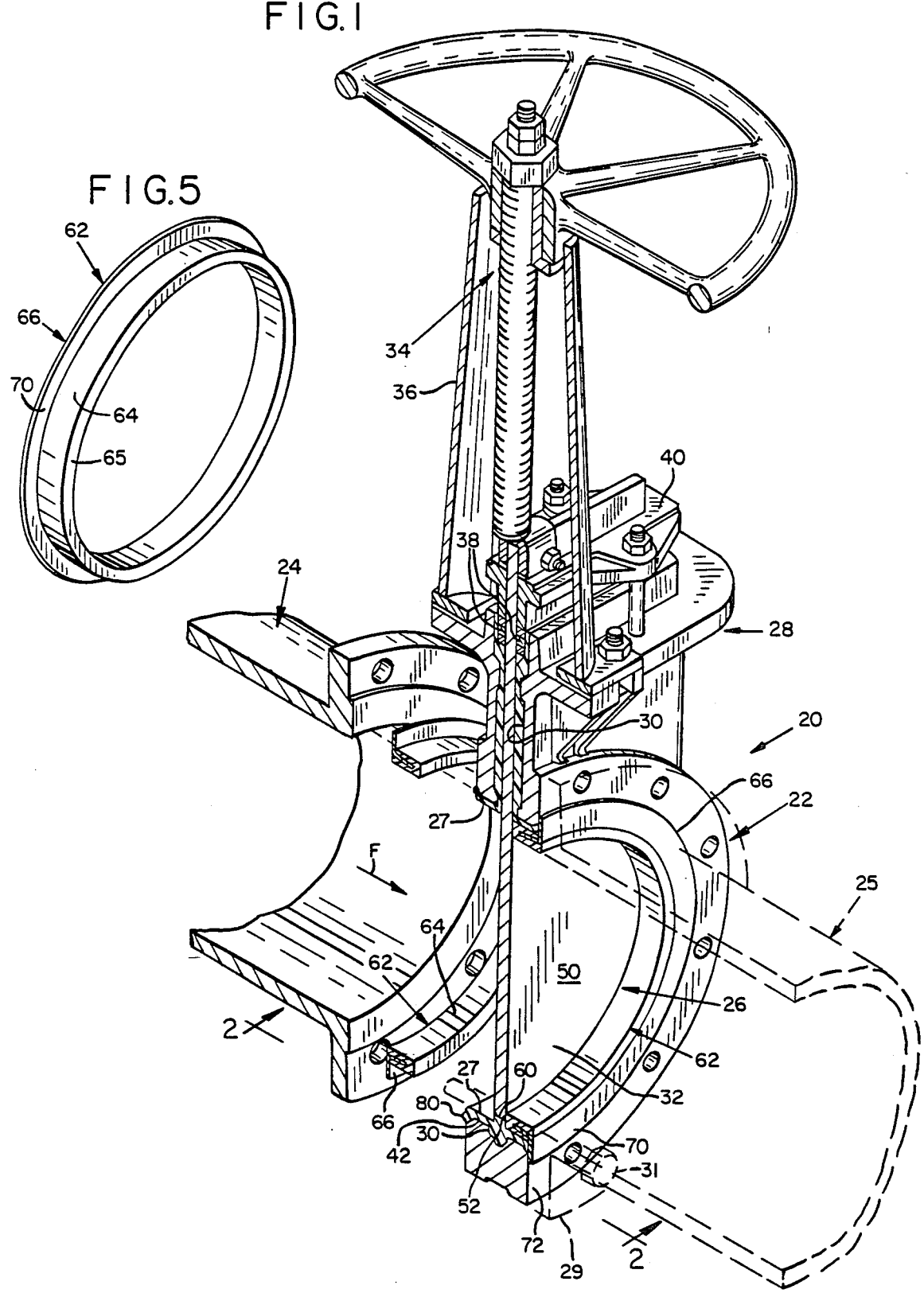
FIG. 1 is an isometric view in cross section, partly exploded, of the gate valve formed in accordance with this invention.

Referring to FIG. 1, a gate valve formed in accordance with this invention generally comprises a body 20 configured so that its lower portion 22 fits between two axially aligned conduits 24, 25. The lower portion 22 has a port 26 formed in it. Fluid flows between the two conduits 24, 25 through the port 26 in the direction indicated by the arrow F in the figure. The body has a generally vertically oriented slot 30 formed in it. The slot extends through the upper portion 28 of the body downwardly nearly through the lower portion 22 of the body. A portion of the slot 30 coincides with the port 26. The slot 30 and port 26 are lined with a resilient wear-resistant liner 27.

A thin, flat gate 32 is positioned within the body 20 of the gate valve. The gate fits within the slot 30 and is movable within the body to open or close the port 26. The movement of the gate is controlled by a conventional threaded stem and handwheel assembly 34 supported by a yoke 36 that is mounted to the upper portion of the gate valve body. At the top of the upper portion 28 of the gate valve body the gate 32 passes from the slot through conventional packing material 38. The packing material 38 is held within the upper portion of the body by a packing gland 40 that is bolted to the valve body.

Figure 2:
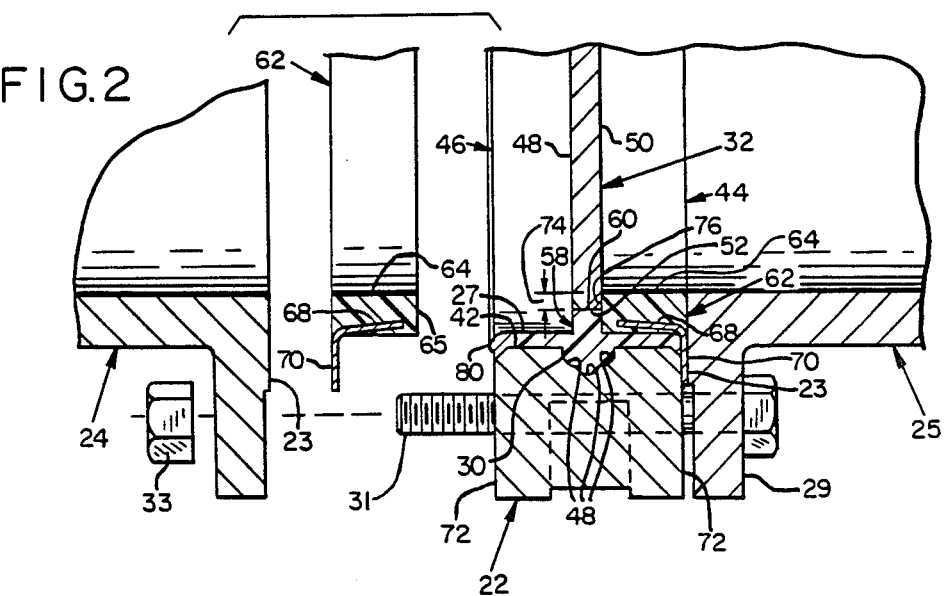
FIG. 2 is a detail cross-sectional view taken along line 2—2 of FIG. 1.
Figure 3:
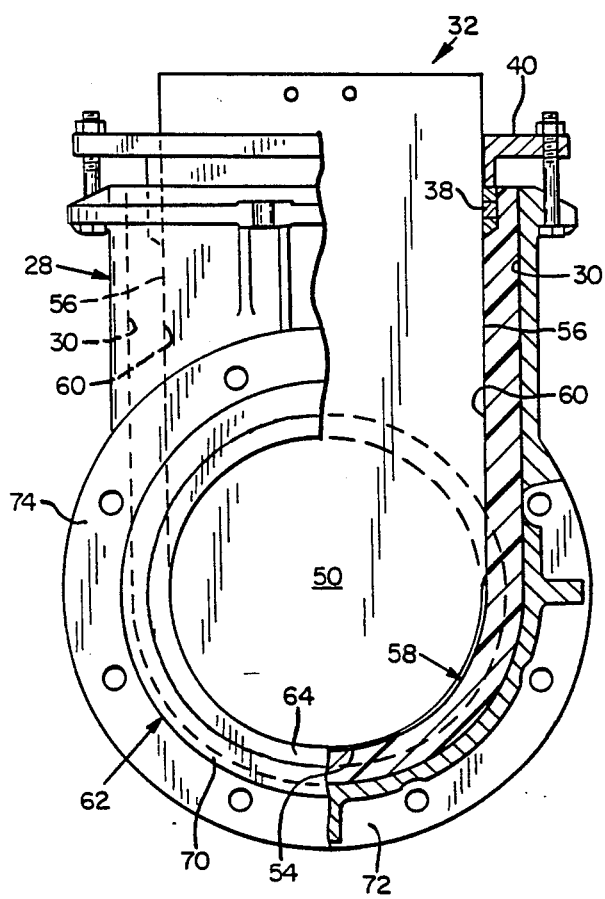
FIG. 3 is a side view of the lower portion of the gate valve in partial section.
Figure 4:
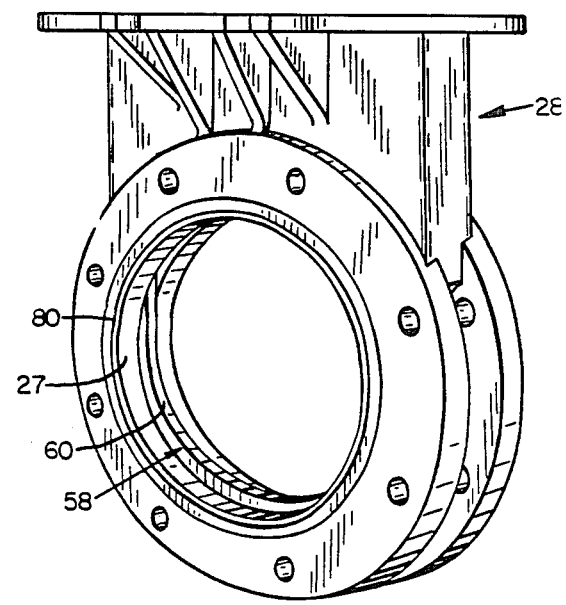
FIG. 4 is an isometric view of the lower portion of the gate valve with the seal rings removed.

Turning to the particulars of the preferred embodiment of the present invention with reference to FIGS. 1-5, the slot 30 in the body is slightly wider than the gate 32 (as measured horizontally across the slot in the direction perpendicular to the direction of flow F in the conduits). The slot is slightly thicker than the gate (as measured in the direction of flow F). As shown in FIG. 2, the slot is configured in cross section to have three adjoining concave sections 48. This configuration of the slot is preferred because it effectively anchors the liner 27 that fills a portion of the slot as described in more detail below.

The portion of the valve body that defines the port 26 is preferably circular, having a sidewall 42 extending through the body from the downstream side 44 of the body to the upstream side 46 of the body. The sidewall 42 is substantially smooth in the direction of fluid flow except where the slot 30 interrupts it at its center. The sidewall 42 is chamfered where it meets each side 44, 46 of the body.

The gate 32 has an upstream surface 48, an opposing downstream surface 50, and an edge surface 52 that extends between the peripheries of the upstream and downstream surfaces. When viewed in side elevation (FIG. 3), the gate 32 is generally U-shaped, having a semicircular bottom 54 and straight parallel sides 56.

The liner 27 is preferably formed of polyurethane and is molded in place to fill the space between the gate 32 and the body when the gate is in the closed position. The liner also extends outwardly from the slot 30 to cover the sidewall 42 that defines the port 26. Preferably, the liner includes an integrally formed central rim 58 of rectangular cross section and having a thickness approximately equal to the gate. The rim protrudes inwardly to contact the portion of the edge surface 52 of the gate that resides within the lined port 26 when the gate is in the closed position. The part of the surface of the liner (designated sealing surface 60) that contacts the edge surface 52 of the gate extends along the bottom 54 and both sides 56 of the gate. The liner is configured so that when the gate 32 is closed, the edge surface 52 of the semicircular bottom 54 of the gate will bear upon the adjacent portion of the sealing surface 60 of the liner. Further, the parallel sides 56 of the gate fit tightly against the adjacent straight portions of the sealing surface of the liner. The contact between the edge surface 52 of the gate and the sealing surface 60 of the liner provides a leakproof seal at relatively low fluid pressures.

To provide a leakproof seal at relatively high fluid pressures, the valve formed in accordance with this invention includes seal rings 62 positioned against the body at the periphery of the port 26 on each side of the gate 32. As will become clear upon reading this description, a single seal ring may be employed where the fluid flow direction in the conduit is constant. A more versatile valve will result, however, when two seal rings, i.e., an upstream ring and a downstream ring, are employed to provide high pressure sealing for fluid flow in either direction. In any event, since the seal rings are similar, a single downstream ring will be described with common reference numerals applied to each illustrated ring.

The seal ring 62 is annular shaped and comprises two components: a resilient gate-engaging part 64 and a substantially incompressible flange 66. The gate-engaging part 64 is preferably formed of polyurethane and is rectangular in cross section. The gate-engaging part of the seal ring is configured to fit tightly against the portion of liner 27 that covers the sidewall 42. The flange 66 of the seal ring is configured to precisely secure the resilient gate-engaging part 64 of the seal ring in position between the end of the downstream conduit 25 and the downstream surface 50 of the gate. More particularly, the flange 66 is a metal strip bent at its center to form an angle of approximately 95° when viewed in cross section. One leg 68 of the flange is embedded within the resilient gate-engaging part 64 of the seal ring. The exposed other leg 70 of the flange extends outwardly across an adjacent flat conduit-joining surface 72 formed in the valve body. A conduit-joining surface is formed in each side 44, 46 of the valve body. Exposed leg 70 of the flange is pinched between the conventional raised face 23 of a mounting flange 29 formed in the conduit 25 and the conduit-joining surface 72 of the valve body when the conduits 24, 25 are joined in conventional manner to the valve body via bolts 31 and nuts 33. A conventional annular gasket (not shown) may be inserted between the flange raised face 23 and the leg 70 of the seal ring flange 66. When the conduits and valve are joined, an inner face 65 of the gate-engaging part 64 of the ring is secured immediately adjacent to the surface 50 of the gate 32. It is noteworthy that the seal ring 62 is readily replaceable by merely disconnecting the conduit from the valve. No additional fasteners are employed for removing or replacing a seal ring.

With the exposed rigid leg 70 of the valve secured between the conduit 25 and the valve body as just described, the conduit-engaging part of 64 of the seal ring is precisely anchored around the downstream surface 50 of the gate. That is, the leg 70 of the rigid, incompressible flange 66 will not stretch or compress unevenly as the valve and conduits are joined as just described. As a result, the face 65 of the gate-engaging part 64 bears upon the gate with substantially uniform pressure around the periphery of the port when the gate is closed. This uniform contact with the gate provides a very effective seal under high fluid pressure when the gate is forced by the fluid pressure to press against the face 65 of the seal ring.

As shown in FIG. 2, the height of the protruding rim 58 of the liner 27 is slightly less than the radial thickness of the gate-engaging part 64 of the seal ring. Accordingly, when two seal rings 62 are used, a shallow recess 74 is formed between their gate-engaging parts along the bottom 54 of the gate 32. It is possible that fluid and/or small particles from the slurry may collect in this recess. To ensure that the fluid and small particles do not interfere with the sealing of the edge surface 52 of the gate against the sealing surface 60 on the rim, the peripheries of the sides 48, 50 of the gate are beveled where they meet the edge surface 52 at the bottom 54 of the gate. The beveling creates small drainage chambers 76 on either side of the gate between the gate and the face 65 of the gate-engaging parts 64 of the seal rings. The drainage chambers 76 extend along the rim at the gate bottom 54 and provide a space into which the collected fluid or small particles in recess 74 can be forced by the descending gate so that the edge surface 52 of the gate will smoothly contact the sealing surface 60 on the rim.

It is desirable to include means for sealing the connection between the seal ring 62 and the body of the valve. This is particularly important for an upstream seal ring when the valve is closed (i.e., when the fluid pressure pushes the gate away from the upstream seal ring). To this end, seal ridges 80 are integrally formed in the liner 27 on each side 44, 46 of the valve body. Each seal ridge is semicircular in cross section and protrudes outwardly from its associated side of the body. When the conduit is unconnected to the body, the ridge 80 extends across a plane defined by the associated conduit-joining surface 72 formed on each side of the valve body. When the seal ring and conduit are connected to the body, the protruding seal ridge 80 is compressed into the adjacent portion of the liner, thereby creating a tight seal.

While a preferred embodiment of the invention has been illustrated and described, it will be appreciated that various changes can be made therein without departing from the spirit and scope of the invention. For example, the material forming the liner 27 and resilient gate-engaging part of the seal ring may be formed of high density, corrosion resistant material such as manufactured by E. I. Du Pont de Nemours & Co. under the trademark TEFLON. Further, the gate-engaging part of the seal ring may be formed of any suitable hardened metal.

I claim:

1. A valve for controlling fluid flow between two aligned conduits, comprising:
   (a) a body having opposing first and second sides, each side having a conduit-joining surface formed thereon, the body being configured for connection between the two conduits, the body also having a slot extending partly through it between the opposing sides, the body also having a port extending through the body across the slot, the port defining a passage for fluid flow between the two conduits;
   (b) a gate configured for sliding movement within the slot, the gate having opposing sides and an edge surface extending between the peripheries of the opposing sides, the gate being movable into and out of a closed position wherein the fluid passage is occluded when the gate is in the closed position;
   (c) control means for moving the gate within the slot;
   (d) a resilient liner attached to the body between the gate and the body, the liner including a sealing surface formed thereon, the sealing surface configured for sealing contact with the edge surface of the gate that resides within the body when the gate is in the closed position, the liner also including an integrally formed rim, the rim carrying a portion of the sealing surface and protruding toward the edge surface of the gate; and
   (e) a seal member positioned against the body at the periphery of the port on one side of the gate, the seal member having a gate-engaging part that has a face formed thereon for sealing contact with the adjacent side of the gate when the gate is in the closed position, the seal member also having a flange connected to the gate-engaging part and extending therefrom to be secured between the conduit-joining surface of one side of the body and the associated connected conduit.

2. The valve of claim 1, wherein the gate-engaging part is formed of resilient material and the flange is incompressible.

3. The valve of claim 1, wherein the liner includes a seal ridge integrally formed thereon, the seal ridge being configured and arranged to be compressed against the flange when the conduit is connected to the body.

4. The valve of claim 1, wherein the opposing sides of the gate are beveled along portions of their peripheries, the beveled portion of the gate and the face of the gate-engaging part being configured and arranged so that a chamber resides therebetween when the gate is in the closed position.

5. A valve for controlling fluid flow between two aligned conduits, comprising:
   (a) a body having opposing a first and second sides, each side having a conduit-joining surface formed thereon, the body being configured for connection between the two conduits, the body also having a slot extending partly through it between the opposing sides, the body also having a port extending through the body across the slot, the port defining a passage for fluid flow between the two conduits;
   (b) a gate configured for sliding movement within the slot, the gate having opposing sides and an edge surface extending between the peripheries of the opposing sides, the gate being movable into and out of a closed position wherein the fluid passage is occluded when the gate is in the closed position;
   (c) control means for moving the gate within the slot;
   (d) a resilient liner attached to the body between the gate and the body, the liner including a sealing surface formed thereon, the sealing surface configured for sealing contact with the edge surface of the gate that resides within the body when the gate is in the closed position;
   (e) a seal member positioned against the body at the periphery of the port on one side of the gate, the seal member having a gate-engaging part that has a face formed thereon for sealing contact with the adjacent side of the gate when the gate is in the closed position, the seal member also having a flange connected to the gate-engaging part and extending therefrom to be secured between the conduit-joining surface of one side of the body and the associated connected conduit; and (f) a second seal member positioned against the body at the periphery of the port on the other side of the gate, the second seal member having a gate-engaging part that has a face formed thereon for sealing contact with the adjacent side of the gate when the gate is in the closed position, the second seal member also having a flange connected to the gate-engaging part of the second seal member and extending therefrom to be secured between the conduit-joining surface of the other side of the body and the associated connected conduit.

6. A seal member for a gate valve wherein the gate valve includes a movable flat gate and a conduit-joining surface that is connectable to a conduit that has a flanged end, and wherein the gate valve is operable for regulating fluid flow through the conduit, the seal member comprising:

an annular gate-engaging part positionable within the gate valve immediately adjacent one side of the gate; and a substantially incompressible flange having a first part embedded within the gate-engaging part and a flat second part attached to the first part and protruding from the gate-engaging part, the second part extending between the conduit-joining surface and the flange of the conduit to be pinched therebetween when the conduit and gate valve are connected.

7. The seal member of claim 6 wherein the gate-engaging part is formed of resilient material and wherein the gate-engaging part and flange are configured and arranged so that the seal member is positionable within the gate valve so that no portion of the flange is exposed to fluid flowing through the conduit.

* * * * *